United States Patent [19]
Amrath

[11] Patent Number: 4,639,159
[45] Date of Patent: Jan. 27, 1987

[54] DEVICE FOR ATTACHING BELLOWS TO A CYLINDRICAL MEMBER

[75] Inventor: Hans Amrath, Viersen, Fed. Rep. of Germany

[73] Assignee: TRW Ehrenreich GmbH & Co. KG, Düsseldorf, Fed. Rep. of Germany

[21] Appl. No.: 584,837

[22] Filed: Feb. 29, 1984

[30] Foreign Application Priority Data

Mar. 5, 1983 [DE] Fed. Rep. of Germany ....... 3307929

[51] Int. Cl.⁴ .................. F16J 15/52; F16L 51/02
[52] U.S. Cl. .................................. 403/50; 403/51; 403/122; 403/134; 411/525; 74/18.2; 74/422; 74/498; 277/212 FB
[58] Field of Search ............. 403/50, 51, 134, 36, 403/39, 122; 277/212 FB; 74/18.2, 422, 498; 411/525-528

[56] References Cited

U.S. PATENT DOCUMENTS

| | | | |
|---|---|---|---|
| 2,197,037 | 4/1940 | Gardner | 403/134 |
| 2,718,381 | 9/1955 | Moon | 403/51 |
| 3,322,445 | 5/1967 | Hassan | 403/51 |
| 3,403,932 | 10/1968 | Kutcher | 403/51 |
| 4,299,400 | 11/1981 | Tsuru | 277/212 FB |
| 4,301,691 | 11/1981 | Walter | 403/50 X |
| 4,322,175 | 3/1982 | Szczesny | 277/212 FB |

FOREIGN PATENT DOCUMENTS

| | | |
|---|---|---|
| 1905791 | 12/1964 | Fed. Rep. of Germany . |
| 2032485 | 1/1972 | Fed. Rep. of Germany . |
| 2935005 | 12/1980 | Fed. Rep. of Germany . |
| 2382607 | 9/1978 | France . |

*Primary Examiner*—Cornelius J. Husar
*Assistant Examiner*—Todd G. Williams
*Attorney, Agent, or Firm*—Martin A. Farber

[57] ABSTRACT

A device for attaching a bellows to a cylindrical member, particularly a ball pin of a rack articulation for automotive vehicles. In order to permit a nonslippable attachment of the bellows even to unmachined pins which vary slightly in diameter, it is proposed to arrange between the bellows and the ball pin an annular disk having a closed outer edge and an inner edge which is interrupted by radially extending slots, the inner edge consisting of a plurality of resilient segments which are bent alternately in opposite directions and are pre-stressed against the ball pin.

14 Claims, 9 Drawing Figures

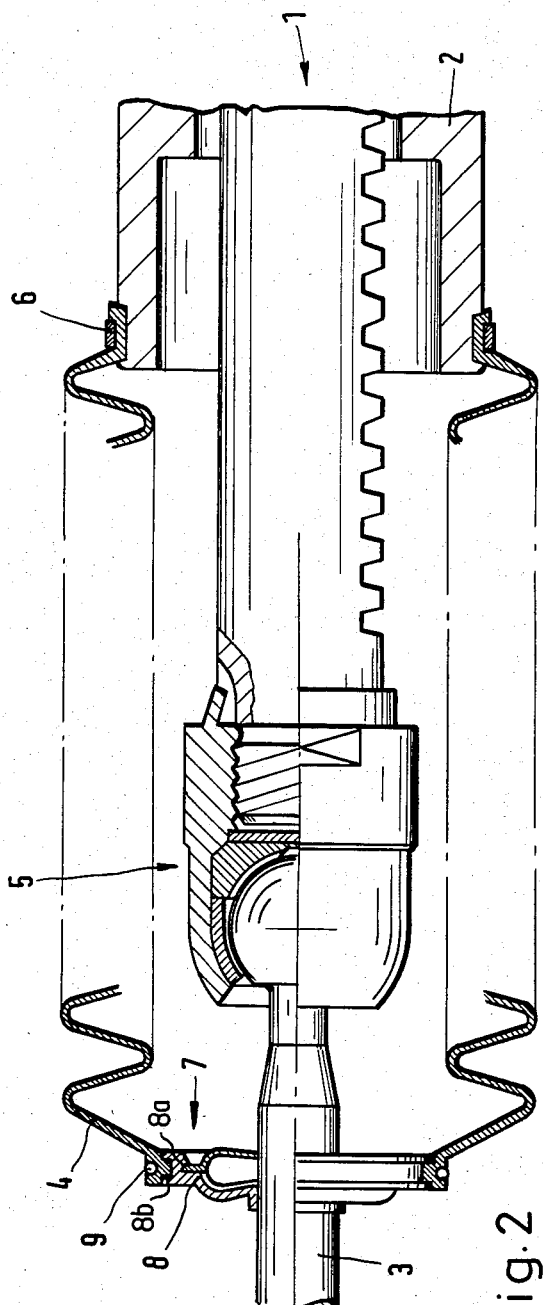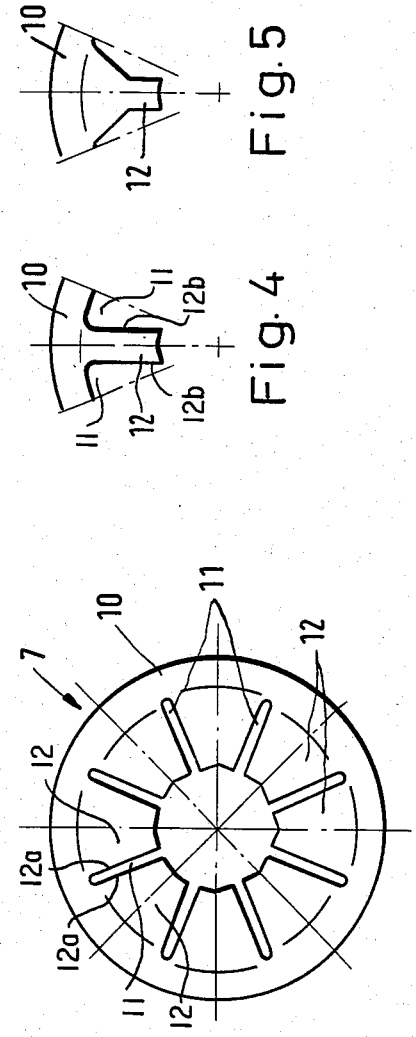
Fig. 2
Fig. 3
Fig. 4
Fig. 5

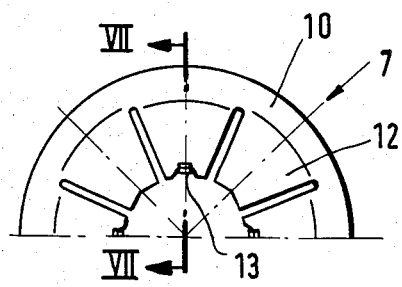
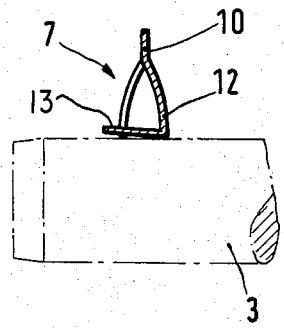
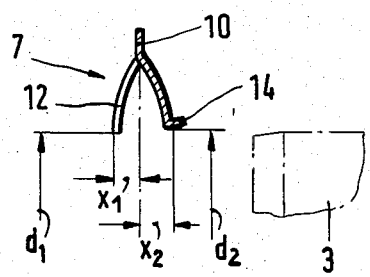
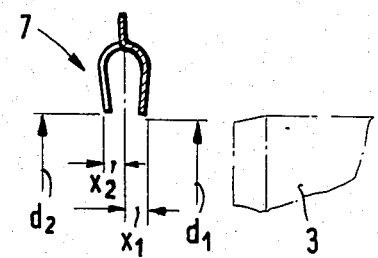

DEVICE FOR ATTACHING BELLOWS TO A CYLINDRICAL MEMBER

BACKGROUND OF THE INVENTION

This invention relates to a device for attaching a bellows to a cylindrical member, particularly to a ball pin of a rack articulation for automotive vehicles.

From Federal Republic of Germany Pat. No. 21 21 381 there is known a rack articulation for automotive vehicles in which a rubber bellows is fastened between a rack housing and a ball pin, in order to seal off a ball joint connection. Both on the ball pin and on the rack housing there are continuous grooves into which the ends of the rubber bellows are fastened by clamps. For this known connection, grooves must be formed in the connecting parts for the rubber bellows, for instance produced therein by machining, in order to assure a non-slippable attachment between the rubber bellows and the connecting part.

Accordingly it is the object of the invention to provide a device for fastening a bellows to a cylindrical member which is simple to construct and mount and can be fastened in non-slippable fashion even to unmachined pins which vary slightly in diameter.

SUMMARY OF THE INVENTION

The present invention comprises an annular disk having a closed outer edge and an inner edge which is interrupted by radially extending slots. The disk is arranged between the bellows and the ball pin, the inner edge of the disk comprising a plurality of resilient segments which are bent alternately in opposite directions and under initial spring tension (biasing) engage against the ball pin. In one parallel embodiment, the slots can have edges which extend parallel to each other so as to produce segments having the shape of annular sectors. However, it is also possible for the edges of each of the segments to extend parallel to each other so that the slots are developed in the shape of annular sectors. Another variation resides in developing the radially extending edges of the slots or segments non-linearly, the shape selected for the slots or segments depending in practice on how great the initial tension of the resilient segments resting against the ball pin must be in order to assure an unslippable attachment.

Normally the ratio of the unslotted region to the slotted region of the disk amounts to about $\frac{1}{3}:\frac{2}{3}$. However, other ratios are also possible, since the initial tension of the resilient segments can also be varied by the length or depth of the slots.

In order to facilitate the mounting of the annular disk on the cylindrical ball pin, it has been found advantageous to develop inwardly or outwardly bent mounting flanges on the segments facing away from the mounting side. If the mounting flanges are bent outwardly they serve as guide elements during the pushing of the disk onto the ball pin and facilitate the assembly. If the mounting flanges, on the other hand, are bent inwardly and extend out of the hub of the disk on the mounting side, these ends of the mounting flanges serve as points of application of force by the mounting tool, in which case a very simple mounting tool can now be used.

The bellows can either be fastened directly on the outer edge of the disk, in which case, however, it must be guided around the disk down to the pin in order to assure absolute tightness, or it may be fastened with the interposition of a closed holding ring which seals the disk from the outside. In addition, the outer edge of the disk can have an angular bent collar on which the holding ring is fastened. Finally, the holding ring can be provided with a circumferential groove on its periphery, into which groove, the bellows engages and is fastened by a wire ring.

The disk preferably is made of spring steel.

The disk also can be made of resilient plastic.

A device in accordance with the invention has the advantage that special shaping or machining of the connecting parts for the rubber bellows is no longer necessary in order to assure a slip-free attachment. Since the segments, which in accordance with the invention are arranged on the inner edge of the disk, are resilient, even small differences in the diameter of the ball pins, resulting, for instance, from the manufacturing process, can compensated without any perceptible reduction in the resistance to slipping. Furthermore, if at least eight segments are present, the disk can be provided with at least two different inside diameters which are tangent to each other at the inner ends of the segments so as to be able to receive correspondingly larger differences in diameter of the ball pins.

It is equivalent to use the device developed in accordance with the invention also for attaching a bellows to a polygonal body. For this purpose the inner contour of the segment need merely be adapted to the outer contour of the body wherein the disk can be fastened by means of its initial spring tension.

Further details and advantages of the object of the invention can be noted from the following description of the accompanying drawings in which there is shown a device in accordance with the invention in the form by way of example of a rack articulation for the front axle of an automotive vehicle.

BRIEF DESCRIPTION OF THE DRAWINGS

FIG. 2 is a view on a larger scale in longitudinal section, of the portion marked II in FIG. 1.

FIG. 3 is a view of an annular disk with segments in the shape of annular sectors.

FIG. 4 is a view of a portion of a disk having approximately rectangular segments.

FIG. 5 is a view of a portion of a disk with segments of funnel shape.

FIG. 6 is a view of one-half of an annular disk with mounting flanges developed on one side on the segments.

FIG. 7 shows the same disk in section along the line VII—VII of FIG. 6.

FIG. 8 shows an annular disk with outwardly bent mounting flanges developed on one side of the segments, seen in cross section.

FIG. 9 shows an annular disk without mounting flange seen in cross section.

DETAILED DESCRIPTION OF THE PREFERRED EMBODIMENTS

Figure 1:
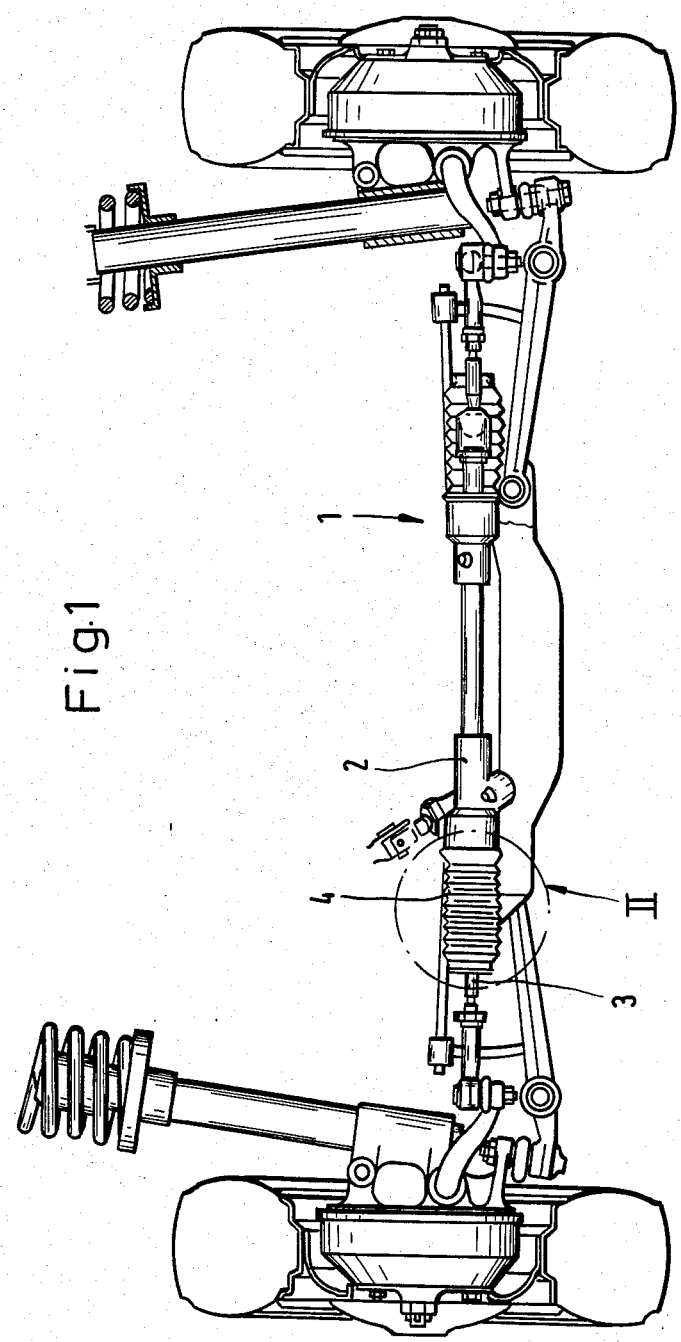
FIG. 1 shows a front axle with rack articulation seen from the front.

In the rack steering linkage 1 of a front axle of an automotive vehicle, a bellows 4 is fastened between a rack housing 2 and a ball pin 3 in order to seal off a ball joint 5 and the rack articulation itself.

While the bellows 4 is fastened to the rack housing 2 by a clamp 6 in a circumferential groove, the device for fastening the bellows 4 to the ball pin 3 comprises annular disk 7 with a holding ring 8 arranged thereon and a wire ring 9 which holds the end of the bellows 4 in a circumferential groove 8b in the holding ring 8.

The annular disk 7 has a closed outer circumferential edge 10 on which the holding ring 8 formed with a complementary inwardly opening annular groove 8a can be snap-fastened, as well as inwardly extending segments 12 separated from each other by slots 11, the segments being in the form of annular sectors in the embodiment shown in FIG. 3, (wherein in an unmounted condition of the disc, each of the slots 11 is defined by edges 12a of the disc 7 which extend parallel to each other, these edges of the disc being edges 12a of adjacent segments 12) approximately rectangular sectors in the embodiment shown in FIG. 4 (wherein each of the segments 12 has edges 12b which extend parallel to each other, the edges 12b defining end portions of adjacent slots 11 respectively bordering each of the edges 12b) and approximately funnel-shaped sectors in the embodiment shown in FIG. 5. The inside diameter of the disk 7, which is defined by the inner ends of the segments 12, is smaller than the outside diameter of the ball pin 3 on which the disk 7 is to be fastened. For this reason the segments 12 are bent alternately in opposite directions out of the plane of the edge 10 and then impart to the disk 7 the inwardly open bell-shaped form which can be noted from the cross sectional views of FIGS. 2 and 7 to 9.

So that the disk 7 can rest under its initial spring tension (biasing) on the ball pin 3, during mounting the resiliently developed segments 12 must be bent further open upon the mounting so that their inside diameter which is defined by the inner ends of the segments 12 is equal to or somewhat greater than the outside diameter of the ball pin 3. In order to facilitate this mounting, the inner ends of the segments 12 can be provided on one side with inwardly bent mounting flanges 13 (FIGS. 6 and 7) or else with outwardly bent mounting flanges 14 which are slightly bent upward. The inwardly bent mounting flanges 13 permit an easy upward bending of the segments 12 attached to them by means of a simple mounting tool which acts from the mounting side. The outwardly bent and slightly upwardly bent mounting flanges 14 (FIG. 8) facilitate the sliding-on and bending open of the disk 7 on the ball pin 3.

FIGS. 8 and 9 show that the initial diameters of the two sides may be different in order to assure easy mounting without problems.

The disk 7 of FIG. 8 is pushed onto the ball pin 3 by applying an axial force to the inside of the segment 12 having the diameter d2. Upon contact of the segments 12 with the initial diameter d1, the axial force is increased; during mounting only the segments 12 having the initial inside diameter d1, slide over the shaft of the ball pin 3.

With a disk shown in FIG. 9, the process of mounting is similar. Here the axial mounting force is applied from the outside onto the segments 12 having the initial inside diameter d2, and the side of the disk 7 having the initial inside diameter d1 is mounted first. By this axial force which is applied as far inward as possible on the segments 12, the inside diameter of the side of the disk 7 having the initial diameter d2 is increased to a value which is greater than the diameter of the ball pin 3.

In addition to the different initial diameters d1 and d2 the measurements X1 and X2 may be of different value in order to effect the mounting again easily.

Aside from the advantages in mounting, different thrust loads in the two axial directions can be obtained by varying these values.

In the mounted position the inner ends of the resilient segments 12 dig with initial spring tension into the surface of the ball pin 3 and in this way assure a slide-free seat both in axial direction and in circumferential direction. The disk 7 can be positioned at any desired place on the ball pin 3 without special design of the ball pin 3 being required for this purpose.

I claim:

1. A device for attaching a bellows to a cylindrical member, comprising:
   an annular disc arranged between an end of said bellows and said cylindrical member,
   means for connecting said annular disc to said bellows,
   the disc having a closed outer edge and an inner edge which is interrupted by substantially radially extending slots in the disc, and
   said disc forming between said slots a plurality of resilient segments, and
   said segments are bent alternately in opposite directions and spring biasingly engage against said cylindrical member.

2. The device according to claim 1, wherein
   in an unmounted condition of said disc, each of said slots, respectively, is defined by edges of said disc which extend parallel to each other, said latter-mentioned edges of said disc are edges of adjacent segments.

3. The device according to claim 1, wherein
   each of said segments, respectively, has edges which extend parallel to each other, said latter-mentioned edges defining portions of said slots respectively bordering said edges.

4. The device according to claim 1, wherein
   said slots are defined by edges of said disc which are bent, said latter-mentioned edges of said disc are edges of said segments.

5. The device according to claim 1, wherein
   the ratio of the unslotted region of the disc to the slotted region of the disc is substantially $\frac{1}{3}:\frac{2}{3}$.

6. The device according to claim 1, wherein
   said opposite directions are opposite axial directions with respect to said disc,
   said alternately bent segments define a first set of said segments bent in one of said opposite axial directions facing away from a side of mounting of said disc on said cylindrical member and a second set of said segments bent in the other of said opposite axial directions,
   axially outwardly bent mounting flanges are formed on said segments of said first set.

7. The device according to claim 1, wherein
   said connecting means comprises a closed holding ring, the bellows being mounted on said closed holding ring,
   said disc is sealed off from the outside by said closed holding ring.

8. The device according to claim 7, wherein
   said outer edge of the disc has a bent collar, said holding ring is fastened to said bent collar.

9. The device according to claim 7, wherein
   said holding ring is formed on its periphery with a groove into which said bellows engages.

10. The device according to claim 1, wherein
    said disc is made of spring steel.

11. The device according to claim 1, wherein said disc is made of resilient plastic.

12. The device according to claim 1, wherein said opposite directions are opposite axial directions with respect to said disc,
said alternately bent segments define a first set of said segments bent in one of said opposite axial directions facing away from a side of mounting of said disc on said cylindrical member and a second set of said segments bent in the other of said opposite axial directions, axially inwardly bent mounting flanges are formed on said segments of said first set.

13. The device according to claim 1, wherein said cylindrical member comprises a ball pin of a rack articulation of an automotive vehicle.

14. The device according to claim 1, wherein said disc in an unmounted condition has two different inside diameters at said inner edge of said respectively alternately bent segments engageable with said cylindrical member.

* * * * *